(12) United States Patent
Ruhnau et al.

(10) Patent No.: US 9,154,715 B2
(45) Date of Patent: Oct. 6, 2015

(54) METHOD AND DEVICE FOR ESTIMATING A FLY SCREEN EFFECT OF AN IMAGE CAPTURE UNIT

(75) Inventors: Paul Ruhnau, Ditzingen (DE); Marc Geese, Gerlingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 44 days.

(21) Appl. No.: 13/989,645

(22) PCT Filed: Sep. 28, 2011

(86) PCT No.: PCT/EP2011/066829
§ 371 (c)(1),
(2), (4) Date: Aug. 9, 2013

(87) PCT Pub. No.: WO2012/069238
PCT Pub. Date: May 31, 2012

(65) Prior Publication Data
US 2013/0308020 A1    Nov. 21, 2013

(30) Foreign Application Priority Data
Nov. 24, 2010   (DE) .......................... 10 2010 061 864

(51) Int. Cl.
*H04N 5/357* (2011.01)
*H04N 5/365* (2011.01)
*H04N 5/361* (2011.01)

(52) U.S. Cl.
CPC .............. *H04N 5/357* (2013.01); *H04N 5/361* (2013.01); *H04N 5/365* (2013.01)

(58) Field of Classification Search
CPC ........ H04N 5/357; H04N 5/361; H04N 5/365
See application file for complete search history.

(56) References Cited

U.S. PATENT DOCUMENTS

| 7,362,911 B1 | 4/2008 | Frank |
| 2005/0247867 A1 | 11/2005 | Volgt et al. |
| 2008/0056606 A1 | 3/2008 | Kilgore |
| 2009/0154826 A1 | 6/2009 | Park et al. |
| 2011/0102647 A1* | 5/2011 | Kim et al. ..................... 348/243 |

FOREIGN PATENT DOCUMENTS

| JP | 7-15632 | 1/1995 |
| JP | 2005-347939 | 12/2005 |

OTHER PUBLICATIONS

International Search Report, dated Dec. 20, 2011, issued in corresponding PCT Application No. PCT/EP2011/066829.

* cited by examiner

*Primary Examiner* — Twyler Haskins
*Assistant Examiner* — Angel L Garces-Rivera
(74) *Attorney, Agent, or Firm* — Kenyon & Kenyon LLP

(57) ABSTRACT

A method for estimating a fly screen effect of an image capture unit is described, having a plurality of image sensors for providing an item of light intensity information. The method includes a step of determining an image property of an item of image information, based on a plurality of items of light intensity information and on a plurality of parameters, each of the plurality of parameters being associated with each of the plurality of image sensors. This method also includes a step of ascertaining a plurality of parameter values for the plurality of parameters, in which the image property is at least made to approximate an ideal image property, the plurality of parameters representing the fly screen effect in a model of the image capture unit.

16 Claims, 2 Drawing Sheets

METHOD AND DEVICE FOR ESTIMATING A FLY SCREEN EFFECT OF AN IMAGE CAPTURE UNIT

FIELD OF THE INVENTION

The present invention relates to a method for estimating a fly screen effect of an image capture unit, a method for correcting a fly screen effect of an image capture unit and a corresponding device.

BACKGROUND INFORMATION

Methods of correcting the fly screen effect are sufficiently well known in the industries of modern display equipment design and modern image capture. In most applications, however, the fly screen effect (English and technical literature: also fixed pattern noise, FPN) is estimated during manufacture and additionally or alternatively in a separate laboratory environment.

A few scene-based methods for reducing the fly screen effect are also found in scientific publications, e.g., in R. C. Hardie, M. M. Hayat, E. Armstrong and B. Yasuda, "Scene-based nonuniformity correction with video sequences and registration," Optical Society of America, Applied Optics No. 8, vol. 39, pp. 1241-1250, 2000 or in United States Published Patent Appln. No. 2009/0257679. However, the methods used there are based mainly on the assessment of the optical flow or other methods and sequences closely related thereto.

SUMMARY

Against this background, a method for estimating a fly screen effect of an image capture unit, a method for correcting a fly screen effect of an image capture unit, also a device which uses these methods and finally a corresponding computer program product according to the present invention are presented with the present invention. Advantageous embodiments are derived from the following description.

The present invention is based on the finding that there are constant changes in the image information detected by an image capture unit due to a movement of the image capture unit or the surroundings detected by the image capture unit. If image information detected over a period of time is averaged or added up, the resulting image information typically has a smooth curve. Areas in which the smooth curve is disturbed indicate interferences caused by the image capture unit. Since a real image capture unit induces such interferences, image information detected by an image capture unit as well as the resulting image information generated from multiple detected image information items does not have a smooth curve. The interferences caused by the image capture unit may be described by corresponding parameters in a model description of the image capture unit. If the parameters are set optimally for the image capture unit, then the image information detected by the image capture unit may be corrected by the parameters in such a way that it has a smooth curve. It is thus possible to determine the parameters by the resulting image information being acted upon by parameters in accordance with the model description, and values for the parameters in which the resulting image information has a preferably smooth curve being sought. Alternatively, detected image information may be acted upon with the parameters and subsequently the smoothness of the detected image information may be determined in each case. The individual values for the smoothness of the detected image information may subsequently be summarized as the resulting smoothness, and the values for the parameters at which the resulting smoothness is minimized may be determined.

The approach according to the present invention describes an online method for assessing the fly screen effect based on an analysis of image sequences. This means in particular that the fly screen effect may be measured and corrected outside of a laboratory environment. To achieve this goal, a few assumptions are made about the world and the capture of individual images.

This approach is suitable for a wide variety of video-based methods of single image capture in natural surroundings. This is true in particular of video sequences of modern vehicle front cameras or cameras on mobile robots.

With the aid of an online FPN correction, it is possible to carry out a correction of the fly screen effect in detected sequences. Thus a correction of the fly screen effect in a video scene improves the image quality, in particular in sequences with little light when using conventional sensors. Improvements in color reconstruction are also possible. Accurate pixel values are used in color reconstruction in particular, in which many pixel values are linked in the course of a calculation. FPN-corrected image data cause less color noise in the image, in particular in sequences of dim lighting. Furthermore, improvements in the algorithm function are possible. Many algorithms depend on "good" image signals, i.e., those suitable for the respective algorithm. The fly screen effect, in particular the gap FPN, which occurs preferentially, interferes with the image processing algorithms, e.g., a lane recognition algorithm. Correcting the fly screen effect may improve the function of such algorithm functions.

Renewing the calibration of the image capture unit after a few years of practical use is advisable. Since an online FPN correction algorithm is used according to the present invention, the fly screen effect may be corrected at certain time intervals. This means that the changes in the fly screen effect, which take place over large time scales, may be corrected. This improves the quality of the product. A detection of temperature-dependent FPN correction variables during practical use is also possible. The fly screen effect is generally a very temperature-dependent phenomenon. With the aid of the online FPN correction, various temperature-dependent correction parameters (data) may be detected and corrected. All measured data are temperature-dependent and may therefore also be measured without online FPN correction. However, with the aid of the online FPN correction, the FPN may be corrected as a function of temperature.

This also yields cost savings during the manufacturing process. With the use of an online FPN correction, it is possible to omit the step during the manufacturing process in which the fly screen effect is measured and subsequently stored in the device. In this way, the memory space in the device may also be reduced. This permits the use of less expensive image device hardware due to the good correction methods.

The approach according to the present invention is based on the derivation of spatial and/or time properties of measured images or image sequences, i.e., the image property, in short. This image property may be implemented by smoothness but also the change in smoothness or a global image property with a completely different definition. Such an image property may generally be imaged on a number. In addition, assumptions are made by estimates about this image property for an ideal image or an ideal image sequence. This estimate may be derived theoretically, for example, or heuristically deduced, i.e., based on experience. Based on a comparison of the measured image property with an assumed ideal image property, image correction parameters with which the image property of the measured images is corrected in the direction of the ideal image property are now estimated. A minimization process then finds the ideal parameter set for the given input data. The ideal images need not be known completely. Instead it is sufficient to define an abstract image property of these images in such a way that the results obtained may be used appropriately in the real application.

In the case of the FPN correction, the approach according to the present invention may be applied as follows. As a global parameter of the measured images, the smoothness of combined individual images of a sequence is estimated, or alternatively, the smoothness of multiple single images is combined. An undistorted smooth image is assumed as the ideal image. The correction parameters which correct the smoothness of the measured image to the assumed ideal smoothness of an ideal image may also be described by a sensor model and thus may also be identified with the Fixed Pattern Noise. The minimization process then finds an ideal set of parameters for a given number of images. If these images are selected representatively and are sufficient in terms of the number, then the found FPN also corresponds to the FPN of the image capture unit within the scope of the model.

The present invention creates a method for estimating a fly screen effect of an image capture unit having a plurality of image sensors for providing light intensity information, which includes the following steps:

determining an image property of an image information item based on a plurality of light intensity information items and a plurality of parameters, in which each of the plurality of parameters is assigned to each of the plurality of image sensors, and ascertaining a plurality of parameter values for the plurality of parameters in which the image property is approximated at least to an ideal image property, the plurality of parameters representing the fly screen effect in a model of the image capture unit.

The fly screen effect (Fixed Pattern Noise) refers to an undesirable image artifact which is due to the technical design of the image capture unit. The image capture unit may be a camera or part of a camera, for example, a number of image sensors. The image capture unit may be situated on a vehicle, for example, to capture the surroundings of the vehicle. Light intensity may be detected by a pixel of the image capture unit. Multiple light intensities of a plurality of adjacent pixels detected simultaneously or in immediate succession may be combined into one item of light intensity information. The light intensity information may thus be an image or a photograph of the image capture unit or a subarea of a corresponding image or a corresponding photograph. Light intensity information may thus be detected or provided by one area of a sensor surface area of the image capture unit. If a two-dimensional coordinate system is drawn in the sensor surface area, the light intensity information may have different light intensity values for different coordinates. The plurality of parameters may likewise have different values for different coordinates of the coordinate system. The plurality of parameter values may be represented as a matrix of numbers in which a separate number in the form of a parameter value is assigned to each image sensor. The plurality of light intensity information items may be detected in chronological order by one and the same area of the sensor surface area. A number of items of light intensity information used may depend on a maximum possible resolution of a light intensity by a pixel of the image capture unit. Thus the number of light intensity information items may be greater than the resolution. The image capture unit may be described by a model. The model may define a relationship between a real item of image information detected by the image capture unit and the corresponding image information detected by the image capture unit. The model may represent a mathematical function. The at least one parameter may be a variable of the model. In particular, the at least one parameter may be an interference variable of the model representing the fly screen effect. The image information may be determined from the light intensity information as well as the plurality of parameters by combining the light intensity information and then subjecting it to the plurality of parameters or by subjecting the light intensity information to the plurality of parameters individually and then combining them. The image property may represent a spatial property and/or a time property of the image information. The ideal image property may be estimated in advance for an ideal image or an ideal image sequence. The image property may be represented by a value or a number. The approximation of the image property to the ideal image property may be carried out based on a comparison between the ideal image property and the instantaneous image property, which is ascertained using instantaneous parameter values. The parameter values in which a deviation between the ideal image property and the instantaneous image property is minimal or is within a tolerance window may be found through multiple comparisons. One example of a suitable image property is the smoothness of the image information. Smoothness may mean the absence of high frequencies with respect to the image information. Minimal smoothness occurs at constant image information, which is not desirable because the image information is then deleted. The "desirable" smoothness, which may correspond to the ideal image property, does not contain any of the interfering image components. These interfering image components are usually represented by high spatial frequencies and do not occur in the real undisturbed image information. The individual parameter values of the plurality of parameter values may be selected accordingly in such a way that the image property corresponds to the ideal image property or comes as closely as possible to the ideal image property, e.g., around a value of the ideal image property within a predetermined value range. For the example of smoothness, the ideal image property occurs when the image information has as few high frequencies as possible. A corresponding online estimation method for the fly screen effect may be carried out online, i.e., during operation of the image capture unit by the image capture unit providing photographs of the surroundings.

According to one specific embodiment, the step of determining the image property may include the following steps: combining the plurality of light intensity information items to determine a resulting light intensity information item; the resulting light intensity information item being acted upon by the plurality of parameters to determine a light intensity information item acted upon by the plurality of parameters; and determining the image property as an image property of the light intensity information item thereby acted upon. The combination may take place by a mean value being formed from the light intensity information items or by the light intensity information items being added up. The combination may also be carried out in a completely different manner, for example, by weighting according to the time elapsed. The individual items of light intensity information and the resulting light intensity information both have interference caused by the fly screen effect. The interferences caused by the fly screen effect may be reduced due to the resulting light intensity information being acted upon by the plurality of parameters. The better the interferences are represented by the plurality of parameters, the better the interferences in the light intensity information acted upon may be reduced by using the plurality of parameters. The better the interferences are reduced, the more interference-free, i.e., smoother, is the light intensity information thereby acted upon. Thus the plurality of parameter values is most suitable for reducing the interferences caused by the fly screen effect, which results in an ideal smoothness of the light intensity information thereby acted upon, for example. The minimization procedure may also include regularizing parameters ($\alpha$ and $\beta$) so as not to achieve the greatest possible smoothness, resulting in constant images. These regularizing parameters may be selected in such a way that the smoothness after correction matches the assumed smoothness or empirical smoothness of the real information as closely as possible.

According to an alternative specific embodiment, the step of determining the image property may include the following steps: acting upon each of the plurality of light intensity information items with the plurality of parameters to determine a plurality of light intensity information items that have been acted upon; determining an image property of each of the plurality of light intensity information items acted upon; and determining the image property by combining the image properties of the plurality of light intensity information items acted upon. Since each of the light intensity information items has been acted upon by the plurality of parameters, the interferences caused by the fly screen effect in each of the light intensity information items may be reduced. One value of the image property, for example, the smoothness, may be determined by using a suitable mathematical or logic function. The values of the individual image properties may be combined by forming a mean value from the values or by adding up the values. The more the interferences in the light intensity information items are reduced by the plurality of parameters, the more interference-free are the light intensity information items acted upon, and they have a lower value for the example of smoothness, i.e., the resulting smoothness. Then a low value of smoothness means very smooth and a high value of smoothness means not smooth, i.e., rough.

The at least one parameter may represent the dark signal nonuniformity (DSNU) and additionally or alternatively the photo response nonuniformity (PRNU) of the image capture unit. In principle, all combinations of FPN parameters may be estimated. The photo response nonuniformity may relate to the characteristic noise component of the image capture unit. The dark signal nonuniformity may relate to deviations from signal responses of individual sensor surface areas from an average value for the case when no light strikes the image capture unit. The fly screen effect may be described very well by the PRNU and DSNU parameters. For example, the at least one parameter may include a factor and/or a summand with which a light intensity information item to be detected by the image capture unit is acted upon according to the model to determine a modeled light intensity information item taking into account the fly screen effect. The parameter PRNU may be used as a factor and the parameter DSNU may be used as a summand.

The plurality of parameter values of the plurality of parameters may be ascertained based on a minimization process. Thus a suitable parameter value may be ascertained for each individual one of the plurality of parameters. For example, the plurality of parameter values may be determined as the minimums of a function describing the smoothness of the image information, the function including a derivation of the image information over at least one main direction of extent of a capture area of the image capture unit. A value of the image property, for example, the smoothness, may thus be determined mathematically and assessed. In general, the image property may represent a spatial property and additionally or alternatively a time property of the image information.

The present information also creates a method for correcting a fly screen effect of an image capture unit which includes the following steps:

ascertaining a plurality of parameter values for a plurality of parameters representing the fly screen effect in a model of the image capture unit according to one of the preceding specific embodiments; and correcting an item of light intensity information of the plurality of image sensors with the plurality of parameter values to determine a light intensity information corrected with respect to the fly screen effect.

The correction may take place in that the light information detected by the sensors is acted upon by the plurality of parameters, for example, in that the light intensity information is multiplied with a corresponding parameter value or a corresponding parameter value is added up. Through this correction, the detected light intensity information may be corrected by the ascertained fly screen effect. This may cause a complete or partial correction of the existing fly screen effect.

According to one specific embodiment, during an operating mode of the image capture unit, in which the plurality of image sensors detects light intensity information continuously, the step of ascertaining the plurality of parameter values is carried out repeatedly. Thus, in the correction step, the light intensity information detected may be acted upon by a plurality of parameter values determined last. For example, it is possible to respond rapidly to temperature-dependent changes in this way.

Thus the step of ascertaining the parameter value may be carried out in response to a predetermined value of a detected temperature of the image capture unit or of surroundings of the image capture unit.

The present invention also creates a device which is designed to carry out or implement the steps of the method according to the present invention in corresponding units. The object on which the present invention is based may also be achieved rapidly and efficiently through this embodiment variant of the present invention in the form of a control unit.

A device in the present case may be understood to be an electric device which processes sensor signals and outputs control signals as a function thereof. This device may have an interface which may be implemented in hardware and/or software. In a hardware embodiment, the interfaces may be part of a so-called system ASIC, for example, which includes a wide variety of functions of the device. However, it is also possible for the interfaces to be separate integrated circuits or to include discrete components at least partially. In a software embodiment, the interfaces may be software modules which are present on a microcontroller, for example, in addition to other software modules.

Also advantageous is a computer program product having a program code, which may be stored on a machine-readable carrier such as a semiconductor memory, a hard drive memory or an optical memory and is used to carry out the method according to one of the specific embodiments described above when the program is executed on a device corresponding to a computer.

DETAILED DESCRIPTION

Figure 1:
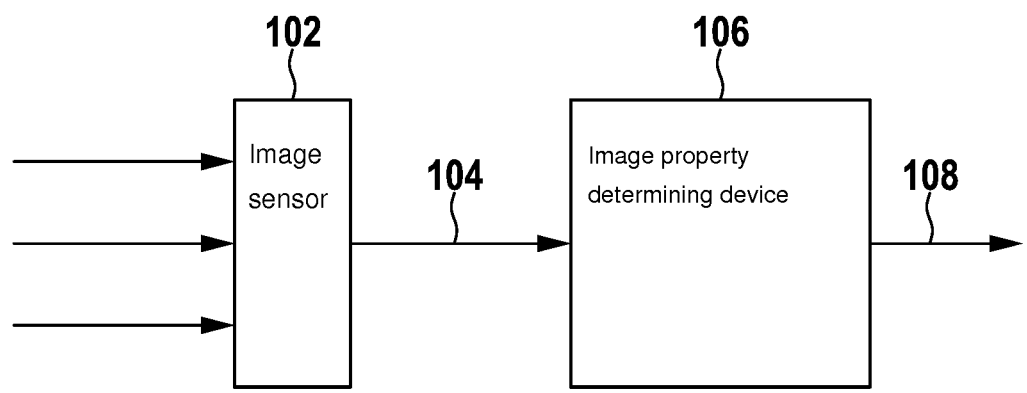
FIG. 1 shows a block diagram of an image capture unit according to one exemplary embodiment of the present invention.

In the following description of preferred exemplary embodiments of the present invention, the same or similar reference numerals are used for the elements, which have similar effects and are represented in the various figures, so that repeated descriptions of these elements may be omitted.

FIG. 1 shows a block diagram of an image capture unit according to one exemplary embodiment of the present invention. The image capture unit has an image sensor 102, which is designed to detect light intensities striking image sensor 102 and is represented by arrows. Image sensor 102 is designed to output a light intensity information item 104, including information concerning the light intensities detected in a partial area or the entire detection surface area of image sensor 102. A device 106 for estimating a fly screen effect of the image capture unit is designed to receive a plurality of light intensity information items 104, which are detected by image sensor 102 at different detection times and are output. Device 106 is designed to determine an image property of an image information item generated from the plurality of light intensity information items 104. Smoothness is used as an image property below as an example. Using smoothness, device 106 is also designed to determine one or multiple parameter values 108, which describe(s) the fly screen effect caused by the image capture unit. Parameter values 108 may be output by device 106 for further use.

Figure 2:
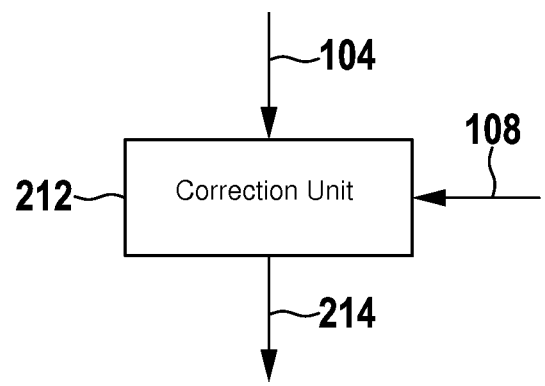
FIG. 2 shows a block diagram of a device for correcting a fly screen effect of an image capture unit according to one exemplary embodiment of the present invention.

FIG. 2 shows a block diagram of a device for correcting a fly screen effect of an image capture unit according to one exemplary embodiment of the present invention. The device has a correction unit 212, which is designed to receive a light intensity information item 104 detected and output by the image capture unit and to receive parameter values 108 suitable for correcting the fly screen effect. Correction unit 212 is also designed to correct the fly screen effect present in light intensity information item 104 by using parameter values 108 and to output a suitably corrected item of light intensity information 214.

Figure 3:
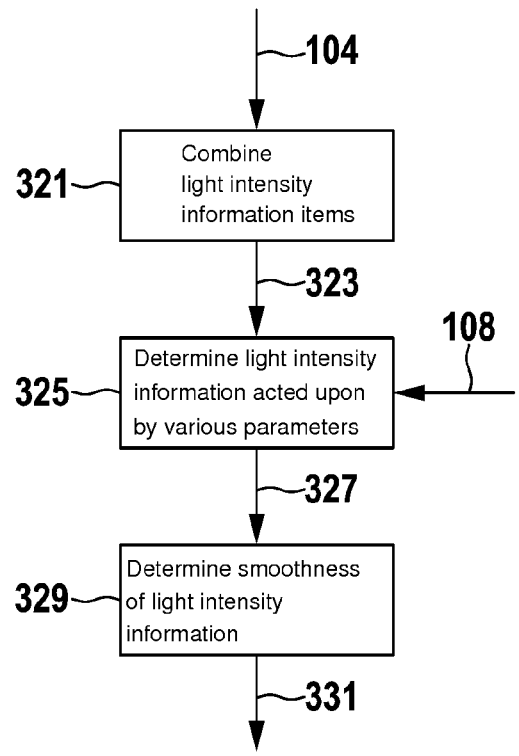
FIG. 3 shows a flow chart of a method for estimating a fly screen effect of an image capture unit according to one exemplary embodiment of the present invention.

FIG. 3 shows a flow chart of a method for estimating a fly screen effect of an image capture unit according to one exemplary embodiment of the present invention. This method may be carried out, for example, by device 106 shown in FIG. 1. Parameter values 108, which may be used by correction unit 212 shown in FIG. 2, for example, are generated with the aid of this method.

In a step 321, multiple items of light intensity information 104 are combined to determine a resulting item of light intensity information 323. In a step 325, the resulting item of light intensity information is acted upon with parameter values 108 of multiple parameters to determine an item of light intensity information 327 acted upon by the parameters. In a step 329, a smoothness 331 of light intensity information 327 acted upon is ascertained. A suitable mathematical or logic function may be used for this purpose. Steps 325, 329 may be carried out repeatedly using other parameter values 108, and the resulting values of smoothness 331 may be compared with each other. Parameter values 108 in which the value of smoothness 331 is at its lowest may be regarded as optimal parameter values 108 and be output. As an alternative to steps 325, 329, a set of optimal parameter values 108 may be found with the aid of a suitable algorithm, for example, a minimization process.

This approach is described in detail below on the basis of one exemplary embodiment.

An optical lens is used in traditional 2D-image capture methods. This optical lens projects the light intensity information from the surroundings at a predefined solid angle onto a 2D sensor configuration, which may be represented as follows:

$$I_{W,2D} \in \Omega \cap R^0 \rightarrow I_{W,2D} \in R^2 \quad (1)$$

where $I_{W,2D}$ may represent a light intensity information item in the sensor plane.

It is now assumed that the average value of information item $I_{W,2D}$ is smooth when averaging is carried out over a long enough period of time.

$$A_{W,2D} = \int_0^T I_{W,2D} dt \quad (2)$$

The averaging may be [carried out] by simple integration or by addition or by concrete averaging, in which the integral in equation (2) is divided by time T.

The assumption is based on the fact that information item $I_{W,2D}$ varies over time in the real world. This may be due to the fact that the camera and the optical lens are in constant motion, as is the case with vehicle front cameras, for example, or due to other effects.

In general, edges of maximal light intensity, which may be recorded by the device, change from one image to the next. It is readily possible to derive from this how many samples are averaged. If an edge is present in one image and not in any other image, then this edge should disappear during averaging. A sensor may generally measure only light intensities of $I_{M,2D} \in [0 \ldots 2^n-1] \cap Z^+$. An edge of maximal light intensity should not amount to more than 1 after being combined. The following holds accordingly:

$$\frac{2^n - 1}{n_{sample}} < 1 \quad (3)$$

$$\Rightarrow n_{sample} > 2^n - 1 \quad (4)$$

$$\quad (5)$$

where $n_{sample}$ indicates how many light intensities are combined.

A smoothness S of an information item X may be expressed as follows:

$$S(X)_{|\cdot|} = \iint |\nabla_{x,y} X(x,y)| dx\, dy \quad (6),$$

where |•| stands for an arbitrary, but reasonable, norm. The lower the value of S, the smoother is the image.

Smoothness here expresses an absence of high frequencies.

It is assumed that the averaged information item in the world is smooth. To this extent it holds that $$S(A_{W,2D})_{|\cdot|} = \iint |\nabla_{x,y} A_{W,2D}| dx\, dy \quad (7)$$

$$= \iint \left|\nabla_{x,y} \int I_{W,2D} dt\right| dx\, dy \quad (8)$$

x and y are coordinates of a coordinate system, which is inserted into the sensor surface area.

This brings up the point that a model of image capture unit $D_{erf}$ should be prepared. In general, a linear model for measured light intensity $I_{M,2D}$ is assumed. However, a higher general order in the sense of a Taylor polynomial may be considered:

$$I_{M,2D} = D_{crf}(I_{W,2D}) \tag{9}$$

$$= \sum_{n=0}^{\infty} \frac{\partial^n D_{crf}(I_{W,3D})}{\partial (I_{W,2D})} \cdot \frac{(I_{W,2D})^n}{n!} \tag{10}$$

$$\approx a \cdot I_{W,2D} + b, \tag{11}$$

where the values expressed with $a_{xy}$ are also known by the term PRNU (photo response nonuniformity), and values x expressed by $b_{xy}$ are also known by the designation DSNU (dark signal nonuniformity).

Inserting this sensor model into equation 8 yields:

$$S(A_{W,2D})_{|\cdot|} = \iint |\nabla_{x,y} \int D_{erf}^{-1}(I_{M,2D}) dt| dx\, dy \tag{12}$$

If it is assumed that this assumption is correct, it may be inferred that the smoothness of the averaged ambient intensity $S(A_{W,2D})$ is disturbed by the capture unit. To obtain the correction values for FPN (a, b), S is now minimized:

$$\min_{a,b} \{S(A_{W,2D})_{|\cdot|}\} \tag{13}$$

To impose certain constraints on the minimization process, it was decided to start with a device model, which on the average has only minor deviations from its ideal parameters, e.g., a=1 and b=0, and to take into account deviations from the ideal state:

$$\min_{a,b}\{S(A_{W,2D})_{|\cdot|} + |a-1| + |b|\} \tag{14}$$

In the remaining course of the task, it was decided to concretize the minimization by using an L2 standard. First, a few acronyms shall be defined:

$$E_{|\cdot|} = S(A_{W,2D}) + |a-1| + |b| \tag{15}$$

$$E_{L_2} = S(A_{W,2D})_{L_2} + (a-1)^2 + b^2 \tag{16}$$

$$\Rightarrow \min_{a,b}\{E\} \text{ or: } \min_{a,b}\{E_{L_2}\} \tag{17}$$

Next the minimization is carried out by $$\min_{a,b}\{E_{L_2}(a,b)\} \Rightarrow \left.\frac{\partial E_{L_2}(a+\epsilon\tilde{a}, b++\epsilon\tilde{b})}{\partial \epsilon}\right|_{\epsilon=0} = 0 \tag{18}$$

$$\Rightarrow \left.\frac{\partial E_{L_2}(a+\epsilon\tilde{a}, b)}{\partial \epsilon}\right|_{\epsilon=0} = 0 \wedge \left.\frac{\partial E_{L_2}(a, b+\epsilon\tilde{b})}{\partial \epsilon}\right|_{\epsilon=0} = 0 \tag{19}$$

$$\tag{20}$$

This minimization is discretized since the sensors of the device do not sample the signal continuously. This is achieved, among other things, with a reconstruction through finite elements of the first order at the positions of all sensors of the same type. Sensors of different types are sensors having different color filters, for example. In other words, sensors of the same type are sensors having the same color filters, for example. This results in a system of equations whose number depends on p·n·m and which is to be solved, where p represents the order of the device model, which is generally 2, and n and m represent the number of sensors within the dimensions of the sensor configuration.

Figure 4:
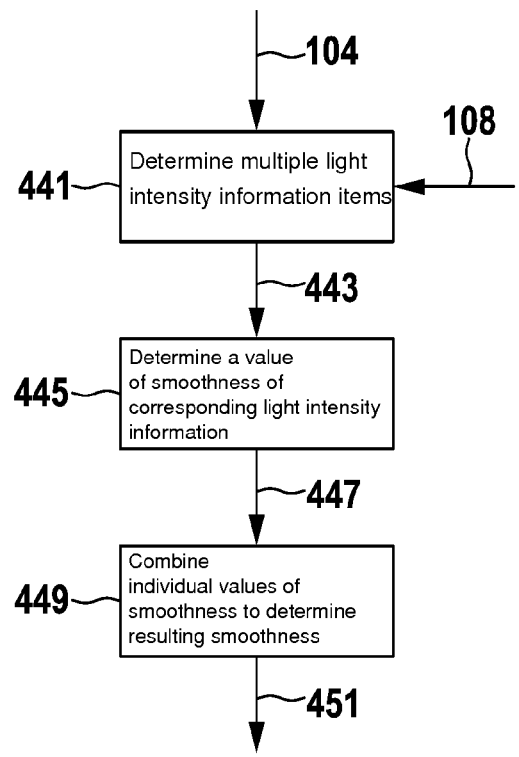
FIG. 4 shows a flow chart of another method for estimating a fly screen effect of an image capture unit according to one exemplary embodiment of the present invention.

FIG. 4 shows a flow chart of another method for estimating a fly screen effect of an image capture unit according to one exemplary embodiment of the present invention. This method may be carried out by device 106 shown in FIG. 1, for example. A parameter value 108 which may be used by correction unit 212 shown in FIG. 2, for example, is generated with the aid of this method.

In a step 441, multiple items of light intensity information 104 are each acted upon by a parameter value 108 to determine multiple light intensity information items 443 thus acted upon. In a step 445, a value for smoothness 447 of corresponding light intensity information items 443 acted upon is determined for each item of light intensity information 443 acted upon. In a step 449, the individual values of smoothness 447 are combined to determine a resulting smoothness 451. Steps 441, 445, 449 may be carried out repeatedly using other parameter values 108, and the resulting values for smoothness 451 may be compared with each other. Parameter value 108 at which the value of smoothness 451 is lowest may be regarded as an optimal parameter value 108 and may be output.

This approach is described in detail below on the basis of one exemplary embodiment.

Each item of intensity information, for example, an image, is deteriorated by the measurement. Deterioration here again means an increase in high frequencies and thus a decline in smoothness.

Smoothness S(X) of an individual image may now be determined with the aid of formula (6) by the same method as that described with reference to FIG. 3.

To take into account the time dimensions, the combination, e.g., the average of all determined smoothness values, should be taken into account. The parameter set of the sensor model is constant in all smoothness calculations.

The average or the combination of smoothness values is minimized to obtain interference-reducing information. This minimization is regulated by the parameters of the penalizer ($\alpha$ or $\alpha$ and $\beta$).

The approaches according to the present invention are not limited to correcting merely the DSNU or the PRNU. Instead of those, the approaches may be expanded to any order of the device model.

Furthermore, the device model may be adapted in a manner such that the resulting equation system is smaller, e.g., allows only a gap FPN. The manner in which the equation system is solved may also be selected freely and adapted mainly to the required accuracy balance and the required processing complexity.

In contrast with other FPN correction schemes, the approach according to the present invention is based on a basic physical assumption about the impression of the surroundings on the device.

Implementation may be accomplished in a program code of a computation unit which is designed to exchange information with the camera. It may also be implemented in hardware. A hardware system requires, among other things, a memory for storing the averaged information.

The approaches according to the present invention may be used with all products for which clear and noise-free images are required. For example, one possibility for use is in a front camera of a vehicle.

The exemplary embodiments described here and illustrated in the figures are selected only as examples. Different exemplary embodiments may be combined completely with one another or with respect to individual features. One exemplary embodiment may also be supplemented by features of another exemplary embodiment. Furthermore, the method steps according to the present invention may be repeated and carried out in a different order than the order described here.

What is claimed is:

1. A method for estimating a fly screen effect of an image capture unit having a plurality of image sensors for providing an item of light intensity information, the method comprising:
    determining an image property of an image information item based on a plurality of light intensity information items and a plurality of parameters, one of the plurality of parameters being assigned to each of the plurality of image sensors, wherein the plurality of parameters represents a dark signal nonuniformity of the image capture unit; and
    ascertaining a plurality of parameter values for the plurality of parameters in which the image property is at least approximated to an ideal image property, the plurality of parameters representing the fly screen effect in a model of the image capture unit.

2. The method as recited in claim 1, wherein the step of determining the image property includes:
    combining the plurality of light intensity information items to determine a resulting light intensity information;
    acting upon the resulting light intensity information with the plurality of parameters to determine the item of light intensity information that is acted upon by the plurality of parameters; and
    determining the image property as an image property of the light intensity information that is acted upon by the plurality of parameters.

3. The method as recited in claim 1, wherein the step of determining the image property includes:
    acting upon each one of the plurality of light intensity information items, with each of the plurality of parameters, to determine a plurality of light intensity information items that is acted upon;
    determining image properties of the plurality of light intensity information items that is acted upon; and
    determining a further image property by combining the image properties of the plurality of light intensity information items acted upon.

4. The method as recited in claim 1, wherein the plurality of parameters also represents a photo response nonuniformity of the image capture unit.

5. The method as recited in claim 1, wherein the plurality of parameter values is ascertained based on a minimization process.

6. The method as recited in claim 1, wherein the image property represents at least one of a spatial property and a time property of the image information.

7. A method for correcting a fly screen effect of an image capture unit of a vehicle, the image capture unit including a plurality of image sensors for providing an item of light intensity information, the method comprising:
    applying a plurality of parameters to each of a plurality of items of light intensity information of the plurality of image sensors to obtain a plurality of items of light intensity information that are acted upon, wherein one of the plurality of parameters is assigned to each of the plurality of image sensors;
    ascertaining individual image properties of the plurality of items of light intensity information that are acted upon;
    determining a global image property by combining the individual image properties, wherein the global image property represents at least one of a spatial and temporal property of the plurality of items of light intensity information that are acted upon;
    comparing the global image property to an assumed ideal image property;
    based on the comparison, approximating the global image property to the assumed ideal image property, wherein the approximating includes ascertaining a plurality of parameter values for the plurality of parameters, the plurality of parameters representing the fly screen effect in a model of the image capture unit; and
    correcting the plurality of items of light intensity information that are acted upon with the plurality of parameter values to determine a plurality of items of light intensity information corrected with respect to the fly screen effect.

8. The method as recited in claim 7, wherein the step of ascertaining the plurality of parameter values is carried out repeatedly during an operating mode of the image capture unit in which the plurality of image sensors provides light intensity information continuously, and in which in the step of correcting the light intensity information is acted upon by a most recently determined plurality of parameter values.

9. A device for estimating a fly screen effect of an image capture unit having a plurality of image sensors for providing an item of light intensity information, the device comprising:
    an arrangement for determining an image property of an image information item based on a plurality of light intensity information items and a plurality of parameters, one of the plurality of parameters being assigned to each of the plurality of image sensors, wherein the plurality of parameters represents a dark signal nonuniformity of the image capture unit; and
    an arrangement for ascertaining a plurality of parameter values for the plurality of parameters in which the image property is at least approximated to an ideal image property, the plurality of parameters representing the fly screen effect in a model of the image capture unit.

10. A non-transitory computer-readable medium on which is stored program code that is executable by a processor for carrying out a method for estimating a fly screen effect of an image capture unit, the image capture unit having a plurality of image sensors for providing an item of light intensity information, the method comprising:
    determining an image property of an image information item based on a plurality of light intensity information items and a plurality of parameters, one of the plurality of parameters being assigned to each of the plurality of image sensors, wherein the plurality of parameters represents a dark signal nonuniformity of the image capture unit; and
    ascertaining a plurality of parameter values for the plurality of parameters in which the image property is at least approximated to an ideal image property, the plurality of parameters representing the fly screen effect in a model of the image capture unit.

11. The method as recited in claim 7, wherein the global image property represents a smoothness of the image information.

12. The method as recited in claim 7, wherein the global image property represents a smoothness change of the image information.

13. The method as recited in claim 7, wherein the global image property is represented by a number.

14. The method as recited in claim 7, wherein a particular one of the plurality of parameter values that leads to ideal smoothness of the plurality of items of light intensity information acted upon is most suitable for reducing the interference caused by the fly screen effect.

15. The method as recited in claim 7, wherein the plurality of parameters represent at least one of a photo response non-uniformity of the image capture unit and a dark signal non-uniformity of the image capture unit.

16. The method as recited in claim 7, wherein the plurality of parameter values is ascertained based on a minimization process.

* * * * *